(12) United States Patent
Andersson et al.

(10) Patent No.: US 11,220,943 B2
(45) Date of Patent: Jan. 11, 2022

(54) INTERNAL COMBUSTION ENGINE ARRANGEMENT

(71) Applicant: VOLVO TRUCK CORPORATION, Gothenburg (SE)

(72) Inventors: Lennart Andersson, Varberg (SE); Arne Andersson, Mölnlycke (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/048,047

(22) PCT Filed: Apr. 16, 2018

(86) PCT No.: PCT/EP2018/025118
§ 371 (c)(1),
(2) Date: Oct. 15, 2020

(87) PCT Pub. No.: WO2019/201411
PCT Pub. Date: Oct. 24, 2019

(65) Prior Publication Data
US 2021/0148271 A1    May 20, 2021

(51) Int. Cl.
*F01N 3/20* (2006.01)
*F02M 26/15* (2016.01)
*F02B 41/06* (2006.01)

(52) U.S. Cl.
CPC ............ *F01N 3/2066* (2013.01); *F02B 41/06* (2013.01); *F02M 26/15* (2016.02)

(58) Field of Classification Search
CPC .......... F01N 3/00; F01N 3/206; F01N 3/2066; F01N 3/021; F01N 3/106; F01N 3/103;
(Continued)

(56) References Cited

U.S. PATENT DOCUMENTS

| 5,103,645 A | 4/1992 | Haring |
| 2012/0260627 A1* | 10/2012 | Durrett .................. F01N 13/00 60/274 |

(Continued)

FOREIGN PATENT DOCUMENTS

| CN | 101900027 A | 12/2010 |
| CN | 106065809 A | 11/2016 |

(Continued)

OTHER PUBLICATIONS

International Search Report and Written Opinion dated Jul. 27, 2018 in corresponding International PCT Application No. PCT/EP2018/025118, 8pages.
(Continued)

*Primary Examiner* — Devon C Kramer
*Assistant Examiner* — Kelsey L Stanek
(74) *Attorney, Agent, or Firm* — Venable LLP; Jeffri A. Kaminski (57) ABSTRACT

The present invention relates to an internal combustion engine arrangement (100) comprising a first (102) and a second (104) expansion cylinder, and an interconnection conduit (106) between an outlet (108) of the first expansion cylinder (102) and an outlet (110) of the second expansion cylinder (104), wherein the outlet of the first expansion cylinder is further arranged in fluid communication with an exhaust gas recirculation (EGR) conduit (112) for delivery of a flow of combusted exhaust gas to an intake passage of the internal combustion engine arrangement, and wherein the second expansion cylinder comprises a reducing agent injection device (114) for controllably delivery of a reducing agent into the second expansion cylinder.

12 Claims, 7 Drawing Sheets

(58) Field of Classification Search
CPC .......... F01N 3/10; F01N 3/20; F01N 2610/02; F01N 13/0087; F01N 13/009; F02M 26/13–16; F02B 41/06; F02B 33/20; F02B 33/22; F02B 33/06; F02B 37/004; F02B 37/105; F02B 37/24; F01B 1/06; F02D 2041/001; F02D 2200/0802; F02D 41/024
USPC .......................................................... 60/295
See application file for complete search history.

(56) References Cited

U.S. PATENT DOCUMENTS

| | | | | |
|---|---|---|---|---|
| 2015/0128576 | A1* | 5/2015 | Osumi | F02D 41/1446 60/287 |
| 2015/0292445 | A1 | 10/2015 | Subramanian et al. | |
| 2016/0333778 | A1 | 11/2016 | Andersson et al. | |
| 2017/0268399 | A1* | 9/2017 | Doring | B01D 53/58 |
| 2018/0347488 | A1* | 12/2018 | Kanno | F02D 41/0007 |
| 2019/0003373 | A1* | 1/2019 | Regner | F02B 37/004 |
| 2019/0136748 | A1* | 5/2019 | Anschel | F02B 37/004 |
| 2021/0148271 | A1 | 5/2021 | Andersson et al. | |

FOREIGN PATENT DOCUMENTS

| | | | |
|---|---|---|---|
| CN | 106948924 A | 7/2017 | |
| DE | 102008049090 A1 | 4/2010 | |
| EP | 2169196 A2 | 3/2010 | |
| EP | 2886827 A1 * | 6/2015 | ............ F02B 37/005 |
| GB | 191212459 A | 5/1913 | |
| JP | 2004076595 A | 3/2004 | |
| WO | 2017100097 A1 | 6/2017 | |
| WO | 2017101965 A1 | 6/2017 | |
| WO | 2017104230 A1 | 6/2017 | |
| WO | WO-2017101965 A1 * | 6/2017 | ............ F01N 3/103 |
| WO | 2018054490 A1 | 3/2018 | |
| WO | 2019201411 A1 | 10/2019 | |

OTHER PUBLICATIONS

International Preliminary Report on Patentability dated Nov. 13, 2019 in corresponding International PCT Application No. PCT/EP2018/025118, 11 pages.

China Office Action dated Oct. 22, 2021 in corresponding China Patent Application No. 201880092359.2, 18 pages.

* cited by examiner

INTERNAL COMBUSTION ENGINE ARRANGEMENT

CROSS-REFERENCE TO RELATED APPLICATIONS

This application is a U.S. National Stage application of PCT/EP2018/025118, filed Apr. 16, 2018, and published on Oct. 24, 2019, as WO 2019/201411 A1, all of which is hereby incorporated by reference in its entirety.

TECHNICAL FIELD

The present invention relates to an internal combustion engine arrangement. The invention also relates to a vehicle comprising such an internal combustion engine arrangement. The invention is applicable on vehicles, in particularly low, medium and heavy duty vehicles commonly referred to as trucks. Although the invention will mainly be described in relation to a truck, it may also be applicable for other type of vehicles.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable.

An example approach for e.g. reaching high pressures and for extracting more energy from the fuel is to use an internal combustion engine arrangement using a compression stage, a combustion stage and an expansion stage. However, a highly efficient vehicle engine may have very cool tailpipe exhaust, which may prevent or reduce the efficiency of exhaust treatment processes provided by an exhaust aftertreatment device such as e.g. a catalytic converter. A solution to reduce e.g. NOx to $N_2$ in the exhaust aftertreatment device is to add a reductant to the exhaust gas upstream the exhaust aftertreatment device.

However, when using an internal combustion engine arrangement provided with exhaust gas recirculation, there is a risk that the reductant will be recirculated to the intake air, which will e.g. increase the risk of damaging the EGR system as well as potentially unnecessary increasing the reductant consumption. There is thus a desire to provide an internal combustion engine arrangement with a reduced risk of receiving reductant in the EGR system.

SUMMARY

It is an object of the present invention to provide an internal combustion engine arrangement which at least partially overcomes the above described deficiencies. This is achieved by an internal combustion engine arrangement according to claim 1.

According to a first aspect of the present invention, there is provided an internal combustion engine arrangement comprising at least one combustion cylinder; a first and a second expansion cylinder, each of the first and second expansion cylinders being arranged in downstream fluid communication with the at least one combustion cylinder for receiving combusted exhaust gas via a respective inlet valve of the first and second expansion cylinders; wherein the internal combustion engine arrangement comprises an interconnection conduit between an outlet of the first expansion cylinder and an outlet of the second expansion cylinder, wherein the outlet of the first expansion cylinder is further arranged in fluid communication with an exhaust gas recirculation (EGR) conduit for delivery of a flow of combusted exhaust gas to an intake passage of the internal combustion engine arrangement, and wherein the second expansion cylinder comprises a reducing agent injection device for controllably delivery of a reducing agent into the second expansion cylinder.

The combustion cylinder is preferably a four-stroke combustion cylinder, i.e. it has one power stroke and one exhaust stroke for every two revolutions of a crank shaft. The combustion cylinder receives air which, together with injected fuel is compressed for achieving the combustion process. As will be described below, the combustion cylinder may be arranged in fluid communication with a compression cylinder for receiving compressed gas into the combustion process.

An expansion cylinder on the other hand should in the following and throughout the entire description be interpreted as a cylinder housing an expansion piston, where the cylinder is arranged to receive exhaust gas from the combustion cylinder and thereafter further provide the exhaust gases out from the expansion cylinder. Hereby, the exhaust gases are expanded due to the increase of the volume within the cylinder bore in which the expansion piston is reciprocating. When the expansion piston thereafter is in an upward motion towards the upper end position of the cylinder, the exhaust gases in the expansion cylinder are directed out from the expansion cylinder. According to the internal combustion engine arrangement described above, the exhaust gas expanded in the first expansion cylinder can be directed to the EGR conduit, while the exhaust gas expanded in the second expansion cylinder can be directed to the atmosphere, preferably via some kind of engine aftertreatment system as will be described further below. The interconnection conduit should thus preferably be arranged in such a way that exhaust gas expanded in the second expansion cylinder is unable to reach the EGR conduit, which is described further below.

Moreover, the wording "reducing agent" should be understood to mean an element that is used in a reduction process. In the reduction process, the reducing agent loses electron(s) and is said to have been oxidized. Various types of reducing agents can be used and the present invention should not be construed as limited to any specific kind. However, as a non-limiting example, the reducing agent may be a water-based urea solution.

Furthermore, the exhaust gas recirculation conduit is a conduit that is arranged to receive and recirculate at least a portion of the exhaust gas back to the at least one combustion cylinder, either directly or via a compression cylinder if such is present. Recirculating exhaust gas may dilute the oxygen in the incoming air stream and provide gases inert to combustion to reduce peak in-cylinder temperatures.

The present invention is based on the insight that by separating the EGR conduit from the reducing agent, the risk of receiving reducing agent into the EGR conduit is reduced. Hence, the EGR conduit will only receive exhaust gas expanded in the first expansion cylinder, whereby the exhaust gas injected with the reducing agent will preferably be directed to e.g. an engine aftertreatment system.

An advantage is thus that reducing agent will not reach the EGR conduit which will reduce the risk of damaging components of an EGR system, as well as reducing the consumption of reducing agent. Moreover, using an interconnection conduit can be beneficial as the flow of EGR to the intake passage of the internal combustion engine arrangement can be kept substantially constant. The interconnection conduit can thus be used as a gas tank for EGR gas such that the intake passage is provided with a continuous flow of EGR for each combustion stage.

According to an example embodiment, the interconnection conduit may comprise a void volume, the void volume comprising a flow restriction arrangement for reducing the flow turbulence within the void volume.

The void volume may form a compartment into which expanded exhaust gas from e.g. the second expansion cylinder can be provided without reaching the EGR conduit. Also, using a flow restriction arrangement is advantageous as the flow turbulence in the void volume can be kept to a minimum, thus reducing the mixing between exhaust gas from the first and second expansion cylinders. This may be particularly advantageous if operating the first and second expansion cylinders sequentially, whereby, for example, the exhaust gas expelled from the first expansion cylinder can push the exhaust gas, which is provided from the second expansion cylinder and already present in the void volume, more or less as a plug. Hereby, the exhaust gas from the first expansion cylinder may not be mixed with the exhaust gas that is already present in the void volume. Using the exhaust gas from the first expansion cylinder to push the exhaust gas in the void volume may require that an inlet to the EGR conduit is closed, preferably by using an EGR valve.

According to an example embodiment, the flow restriction arrangement may comprise an exhaust emission control device. Hereby, the reducing agent that is present in the exhaust gas from the second expansion cylinder can be used as a first stage in a NOx reduction process in the exhaust emission control device.

According to an example embodiment, the exhaust emission control device may comprise an oxidation catalyst. Using an oxidation catalyst is beneficial as it can convert NO to $NO_2$, which is advantageous in a NOx reduction process.

According to an example embodiment, the exhaust emission control device may comprise a selective catalytic reduction (SCR) catalyst.

According to an example embodiment, the flow restriction arrangement may comprise a plurality of tube components arranged at a predetermined distance from each other along the flow direction within the void volume, the inner diameter of the tube components being smaller than the inner diameter of the void volume.

Hereby, the flow turbulence within the void volume will be reduced. An advantage is, as described above, that the exhaust gas from the first and second expansion cylinders will not be mixed with each other as they push each other in the form of the above mentioned plug.

According to an example embodiment, the tube component may be at least one of a rashig ring and a catalyst carrier. Rashig rings and catalyst carrier are well functioning for reducing the flow turbulence and the dispersion of exhaust gas in the axial flow direction. Other alternatives, such as e.g. a substrate of honeycomb type, are also conceivable.

According to an example embodiment, the void volume may be equal to, or larger than a cylinder volume of the second expansion cylinder. Hereby, it can be assured that the expanded exhaust gas from the second expansion cylinder is unable to reach the EGR conduit.

According to an example embodiment, the EGR conduit may be connected to the interconnection conduit at a position between the outlet of the first expansion cylinder and the void volume of the interconnection conduit.

According to an example embodiment, the EGR conduit may comprise an EGR valve for controlling the volume of flow of combusted exhaust gas delivered to the intake passage of the internal combustion engine arrangement. Hereby, exhaust gas from the first expansion cylinder can be controlled to be directed into the EGR conduit when desired and not necessarily at all times.

According to an example embodiment, the internal combustion engine arrangement may further comprise an engine aftertreatment system, the engine aftertreatment system being arranged in fluid communication with the interconnection conduit.

According to an example embodiment, the engine aftertreatment system may be connected to the interconnection conduit at a position between the void volume and the outlet of the second expansion cylinder. Hereby, at least the exhaust gas expelled from the second expansion cylinder, which exhaust gas is injected with the reducing agent, is delivered to the engine aftertreatment system.

According to an example embodiment, the internal combustion engine arrangement may further comprise at least one compression cylinder, the compression cylinder being arranged in upstream fluid communication with the at least one combustion cylinder for delivery of compressed gas to the inlet of the combustion cylinder.

A compression cylinder should in the following and throughout the entire description be interpreted as a cylinder which is arranged to provide compressed intake gas to the combustion cylinder. Preferably, a compression piston is arranged in the compression cylinder and arranged to compress the gas inside the compression cylinder, which compressed gas thereafter is transferred to the intake of the combustion cylinder.

According to an example embodiment, the EGR conduit may be connected to an inlet of the at least one compression cylinder, such that exhaust gas from the EGR conduit is mixed with intake gas in the at least one compression cylinder.

When positioning the EGR conduit at a downstream position from the first expansion cylinder, the pressure level of the EGR flow is slightly higher than the atmospheric gas pressure. An advantage is thus that the relatively low pressurized EGR flow will be pressurized by the at least one compression cylinder before provided to the intake of the combustion cylinder. Hereby, more energy can be extracted from the EGR flow.

Preferably, the internal combustion engine arrangement comprises two compression cylinders and two combustion cylinders, where each combustion cylinder is arranged in fluid communication with a respective one of the compression cylinders.

According to a second aspect, there is provided a vehicle comprising an internal combustion engine arrangement according to any one of the embodiments described above in relation to the first aspect.

Effects and features of the second aspect are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
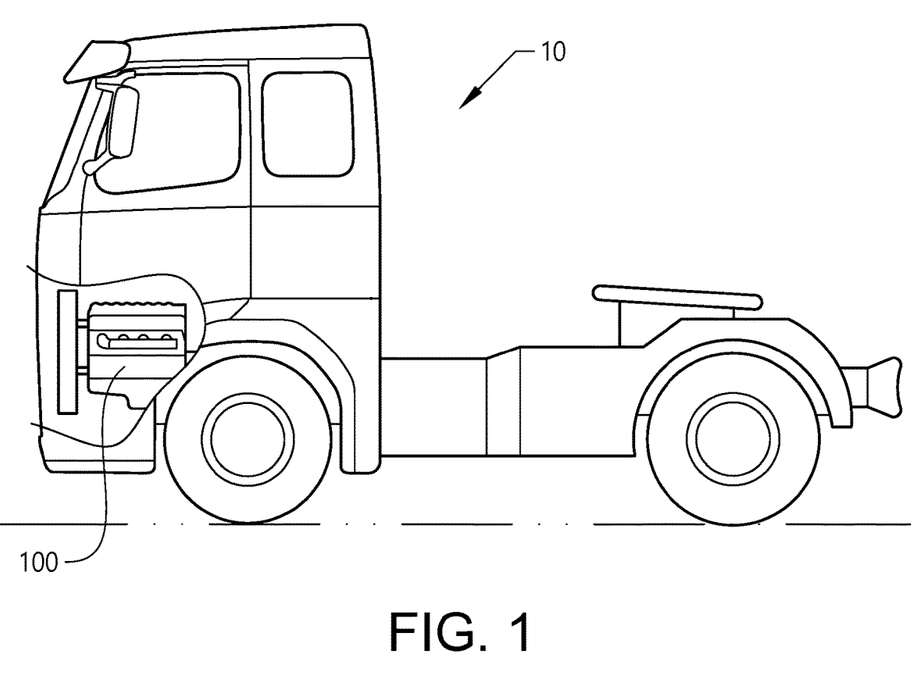
FIG. 1 is a lateral side view illustrating an example embodiment of a vehicle in the form of a truck.

With particular reference to FIG. 1, there is provided a vehicle 10 in the form of a truck. The vehicle 10 comprises a prime mover 100 in the form of an internal combustion engine arrangement 100. The internal combustion engine arrangement 100 may preferably be propelled by e.g. a conventional fuel such as diesel, although other alternatives are conceivable. The internal combustion engine 100 is preferably operated in a four stroke fashion, i.e. operated by an intake stroke, a compression stroke, a combustion stroke, and an exhaust stroke.

Figure 2:
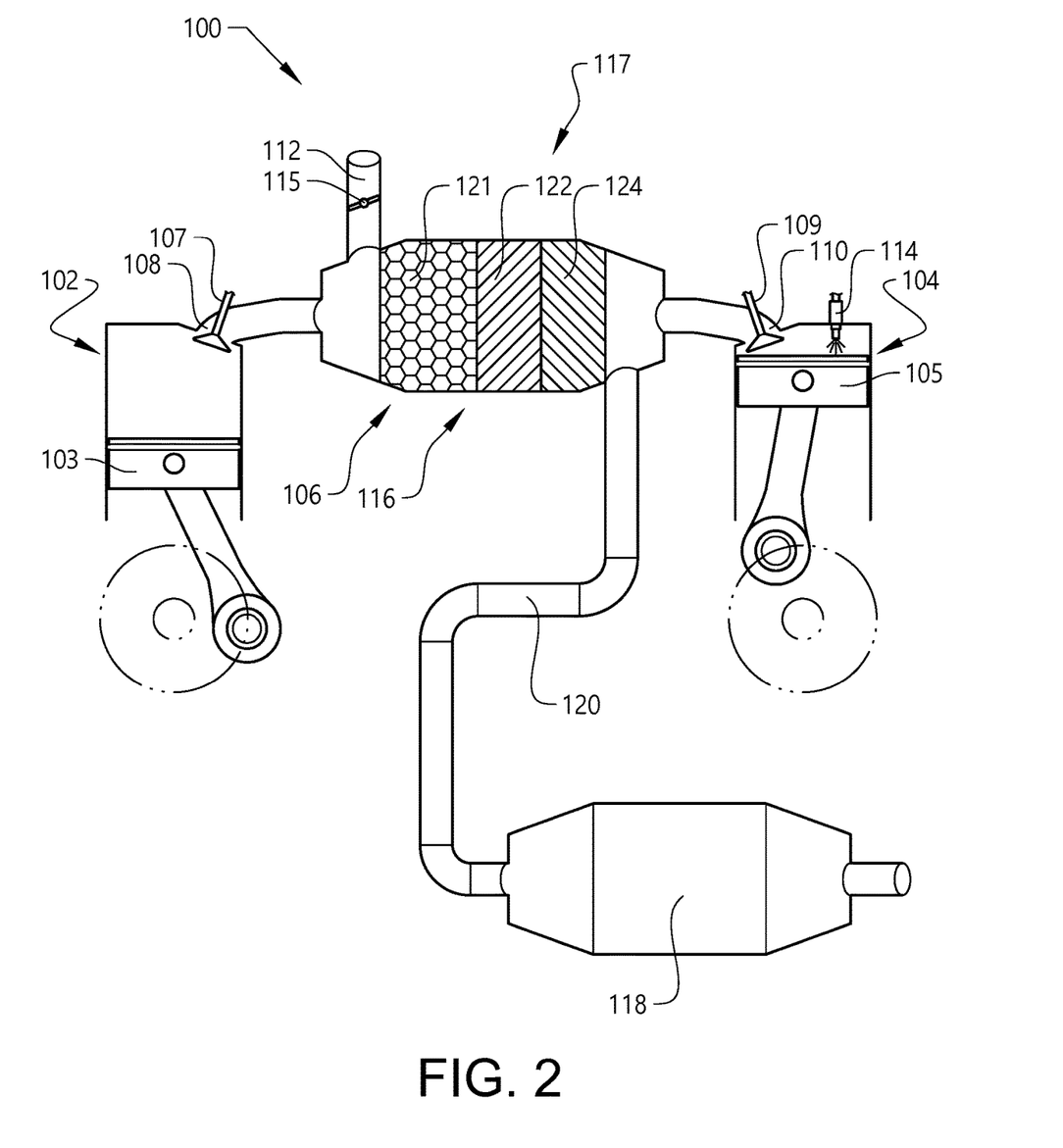
FIG. 2 is a schematic illustration of a first and a second expansion cylinder of an internal combustion engine arrangement according to an example embodiment, and their interconnection to each other and other devices.
Figure 3:
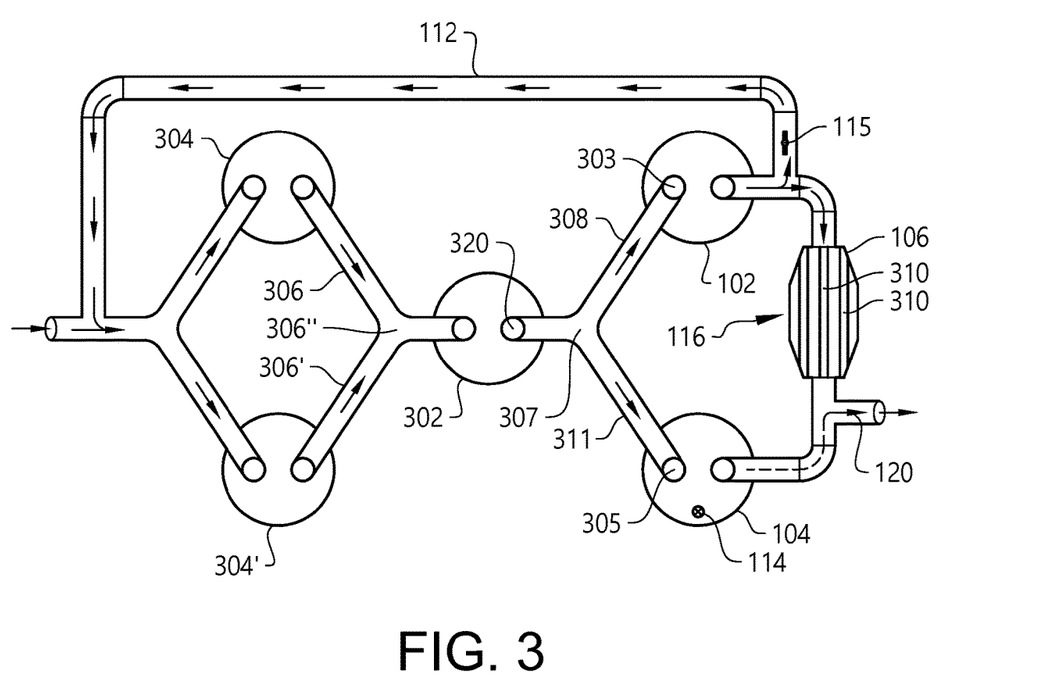
FIG. 3 is a schematic illustration of an internal combustion engine arrangement according to an example embodiment.

Reference is made to FIG. 2, which schematically illustrates a first 102 and a second 104 expansion cylinder of an internal combustion engine arrangement according to an example embodiment. As can be seen, the first expansion cylinder 102 comprises a first piston 103 reciprocating between a bottom dead center and a top dead center within the first expansion cylinder 102. Likewise, the second expansion cylinder 104 comprises a second piston 105. Although not depicted in FIG. 2, each of the first 102 and second 104 expansion cylinders are arranged in fluid communication with at least one combustion engine. Thus, each of the first 102 and second 104 expansion cylinders comprises an inlet for receiving combusted exhaust gas from the combustion cylinder. This is illustrated in FIG. 3 and further described below.

Moreover, the first 102 and second 104 expansion cylinders comprises a respective first 107 and second 109 outlet valve for controlling the delivery of flow of expanded combustion gas out from a respective first 108 and second 110 outlet of the first 102 and second 104 expansion cylinder. The expansion cylinders thus receives combusted exhaust gas from the combustion cylinder, whereby the exhaust gas is expanded in the expansion cylinder before directed therefrom.

As is further depicted in FIG. 2, the internal combustion engine arrangement 100 comprises an interconnection conduit 106 in fluid communication between the outlet 108 of the first expansion cylinder 102 and the outlet 110 of the second expansion cylinder 104. The interconnection conduit 106 preferably comprises a void volume 116 provided with a flow restriction arrangement 117. The flow restriction arrangement 117 is arranged to reduce the flow turbulence, and hence the axial mixing, of the exhaust gas from the first 102 and second 104 expansion cylinders. The void volume 116 and flow restriction arrangement 117 will be described in further detail below.

Furthermore, the internal combustion engine arrangement 100 comprises an exhaust gas recirculation (EGR) conduit 112. The EGR conduit 112 is arranged to controllably, via an EGR valve 115 positioned in the EGR conduit 112, deliver a flow of combusted exhaust gas to an inlet of the internal combustion engine arrangement 100. If the internal combustion engine arrangement 100 comprises one or more compression cylinder(s) (according to the embodiment depicted in FIG. 3), the EGR conduit is preferably connected to the inlet of such compression cylinder(s). If not using a compression cylinder, the EGR conduit is preferably connected to the inlet of the combustion cylinder. Moreover, the EGR conduit 112 is preferably connected to the interconnection conduit 106 at a position close to the outlet 108 of the first expansion cylinder 102 such that only exhaust gas from the first expansion cylinder 102, and not from the second expansion cylinder 104, is delivered to the EGR conduit 112. How this is achieved is described in further detail below. Preferably, the EGR conduit 112 is connected to the interconnection conduit 106 at a position between the outlet 108 of the first expansion cylinder 102 and the flow restriction arrangement 117, i.e. the void volume, of the interconnection conduit 106.

Still further, the internal combustion engine arrangement 100 comprises an engine aftertreatment system 118 arranged in downstream fluid communication with the first 102 and second 104 expansion cylinders via an exhaust gas conduit 120. Preferably, the exhaust gas conduit 120 is connected to the interconnection conduit 106 at a position close to the outlet 110 of the second expansion cylinder 104. As can be seen in FIG. 2, the exhaust gas conduit 120 is connected to the interconnection conduit 106 at a position between the outlet 110 of the second expansion cylinder 104 and the flow restriction arrangement 117, i.e. the void volume, of the interconnection conduit 106. The void volume 116 can thus be defined to extend between the interconnection position of the EGR conduit 112 and the interconnection position of the exhaust gas conduit 120.

As is further depicted in FIG. 2, the internal combustion engine arrangement 100 comprises a reducing agent injection device 114. The reducing agent injection device 114 is connected to the second expansion cylinder 104 and arranged to inject a reducing agent, such as e.g. a urea based solution, into the second expansion cylinder 104 to be mixed with the exhaust gas therein before being exhausted through the outlet 110 of the second expansion cylinder 104. The reducing agent is preferably injected into the second expansion cylinder before or during the expansion stroke in order to utilize the heat in the second expansion cylinder before the exhaust gas therein is fully expanded.

Reference is now again made to the above described interconnection conduit 106. As stated above, the interconnection conduit 106 comprises a void volume 116 provided with a flow restriction arrangement 117. According to the embodiment depicted in FIG. 2, the flow restriction arrangement 117 comprises an exhaust emission control device, here in the form of a honeycomb pattern 121, an oxidation catalyst 122 and a selective catalytic reduction (SCR) catalyst 124. The oxidation catalyst 122 is preferably arranged at a portion of the void volume 116 facing the first expansion cylinder 102, while the SCR catalyst 124 is arranged at a portion of the void volume 116 facing the second expansion cylinder 104. The SCR catalyst 124 may preferably be capable of storing a large amount of e.g. ammonia. The use of an exhaust emission control device in the void volume 116 may be used in combination with the below described various alternatives of flow restriction arrangements. In order to ensure that combustion gas from the second expansion cylinder 104 will not reach the EGR conduit 112, the volume of the void volume 116 is preferably equal to, or larger than the cylinder volume of the second expansion cylinder 104. Hereby, reducing agent will not reach the EGR conduit 112. Moreover, the oxidation catalyst 122 is arranged to produce $NO_2$ from NO, while the SCR catalyst can preferably reduce NOx. Using the oxidation catalyst in combination with the SCR catalyst as depicted in FIG. 2, a fast reaction of $NO_2$ can be achieved which in turn can enable for a reduced size of the engine aftertreatment system 118.

According to an example, in case the EGR valve 115 is kept closed, or just slightly open, some of the exhaust gas from the first expansion cylinder 102 may pass through the void volume 116 and into the exhaust gas conduit 120. At least a portion of the exhaust gas from the first expansion cylinder 102 will thus have converted NO to $NO_2$ in the oxidation catalyst 122, and NOx has been converted to $N_2$ in the SCR catalyst. Also, the exhaust gas from the second expansion cylinder 104 will be provided with reducing agent that will be absorbed by the SCR catalyst 124 as well as by the engine aftertreatment system 118.

According to a further example, in a case when the void volume 116 is relatively large in size, the exhaust gas from the first expansion cylinder 102 may not reach the engine aftertreatment system 118 at all, while exhaust gas from the second expansion cylinder 104 first reaches the SCR catalyst 124 where some of the NOx is reduced and some $NH_3$ can be absorbed. The exhaust gas that passes through the SCR catalyst 124 is provided to the oxidation catalyst 122 where remaining portions of NO can be converted into $NO_2$. When the exhaust gas thereafter is provided "back" in a direction from the first expansion cylinder 102 towards the second expansion cylinder 104, a further portion of NOx in the exhaust gas can be converted to $N_2$.

Reference is now made to FIG. 3, which is a schematic illustration of an internal combustion engine arrangement according to an example embodiment. As can be seen, the internal combustion engine arrangement in FIG. 3 depicts the combustion cylinder 302 which is arranged upstream the first 102 and second 104 expansion cylinders. More specifically, an outlet 320 of the combustion cylinder 302 connects to the first 102 and second 104 expansion cylinders at an interconnection point 307. Exhaust gas from the combustion cylinder is delivered to the interconnection point 307 and thereafter directed to a respective first 308 and second 311 conduit and, via a respective inlet valve 303, 305 to each of the first 102 and second 104 expansion cylinders. Also, the internal combustion engine arrangement in FIG. 3 comprises a first 304 and a second 304' compression cylinder. The compression cylinders 304, 304' are arranged to compress incoming air before delivery to the inlet of the combustion cylinder 302 via an inlet conduit 306. As depicted in FIG. 3, the compressed air from the first 304 and second 304' compression cylinders are delivered to an inlet interconnection point 306" before delivery to the combustion cylinder.

As is further depicted in FIG. 3, the EGR valve 115 is connected to the inlet of the compression cylinders 304, 304'. Thus, exhaust gas from the first expansion cylinder 102 in the EGR conduit 112 is mixed with intake air before provided into the compression cylinders 304, 304' for compression therein.

Moreover, FIG. 3 illustrates a cross section of the void volume 116. As can bee seen, the void volume 116 comprises a flow restriction arrangement 117 in the form of a plurality of tube components 310 arranged at a predetermined distance from each other along the flow direction within the void volume. The inner diameter (not shown) of the tube components 310 is preferably smaller than an inner diameter of the void volume. Hereby, the flow turbulence will be reduced. The tube components 310 may of course be combined with an exhaust emission control device such as the one depicted in FIG. 2 and described above. In such a case, the tube components 310 may preferably be arranged on a respective side of the exhaust emission control device. The tube components 310 may, for example, be formed by so-called rashig rings. The flow restriction arrangement 117 may be formed by other suitable arrangements, such as e.g. the above described honeycomb pattern, etc.

Although FIG. 3 illustrates the use of a single combustion cylinder, two or more combustion cylinders are also conceivable.

Reference is now made to FIGS. 4a-4d, which schematically illustrate the operation of the internal combustion engine arrangement in FIGS. 2 and 3 according to an example embodiment. In the following, the exhaust gas in/from the first expansion cylinder 102 is depicted with dots and given reference numeral 402, while the exhaust gas in/from the second expansion cylinder 104 is depicted with dots and given reference numeral 404. Also, for each of the below described figures, the EGR valve 115 is arranged in an open position for allowing exhaust gas to be delivered into the EGR conduit 112. Moreover, the flow restriction arrangement 117 has been omitted in the illustrations in FIGS. 4a-4d for being able to illustrate the different flows in further detail.

Figure 4A:
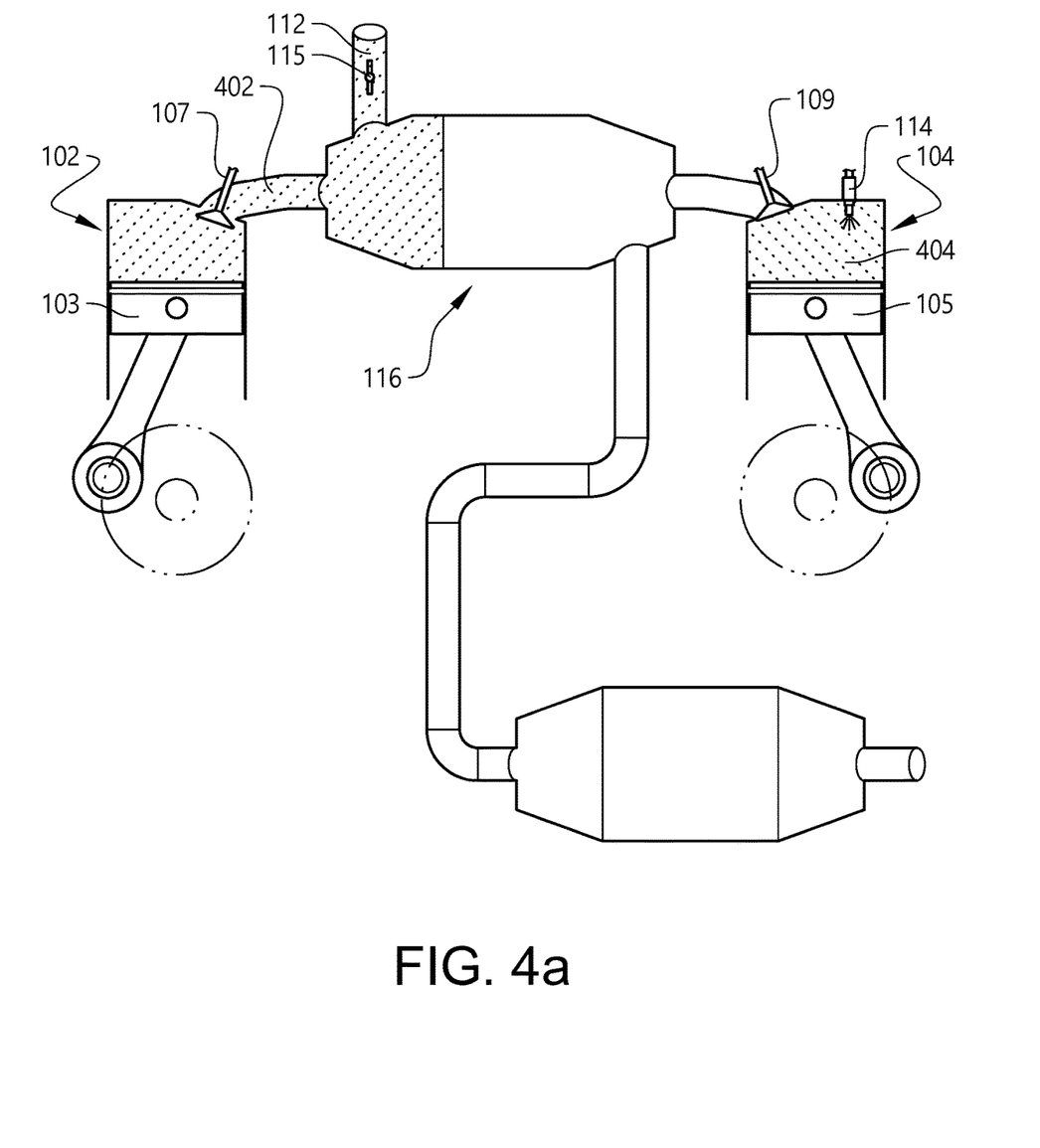
FIGS. 4a-4d schematically illustrate the operation of the internal combustion engine arrangement in FIGS. 2 and 3 according to an example embodiment.

With initial reference to FIG. 4a, the first piston 103 is moving upwards within the first expansion cylinder 102, whereby the first outlet valve 107 is arranged in an open position. Hereby, expanded exhaust gas 402 is directed out from the first expansion cylinder 102 and into the void volume 116 as well as into the EGR conduit 112. At the same time, the second piston 105 is moving downwards within the second expansion cylinder, while keeping the second outlet valve 109 in a closed position. Also, the reducing agent injection device 114 injects reducing agent into the second expansion cylinder 104. Hereby, the exhaust gas 404 present in the second expansion cylinder is provided with reducing agent and is expanding.

Figure 4B:
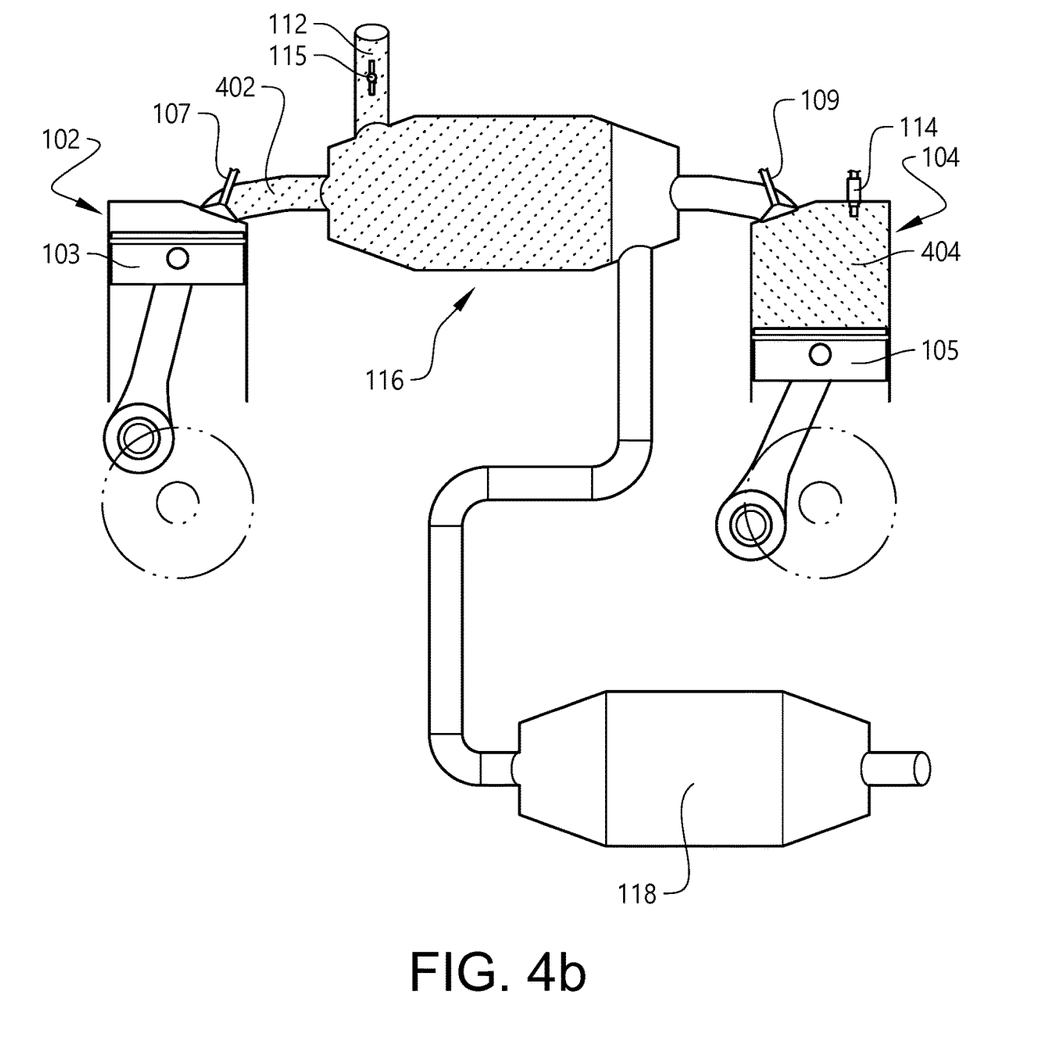

Thereafter, and as depicted in FIG. 4b, the first piston 103 has moved to the top dead center position within the first expansion cylinder 102, while the second piston has moved to the bottom dead center position within the second expansion cylinder 104. The first 107 and second 109 outlet valves are arranged in the closed position. At this stage, the first expansion cylinder 102 has been substantially emptied of exhaust gas 402, which is provided in the void volume 116 and the EGR conduit.

Figure 4C:
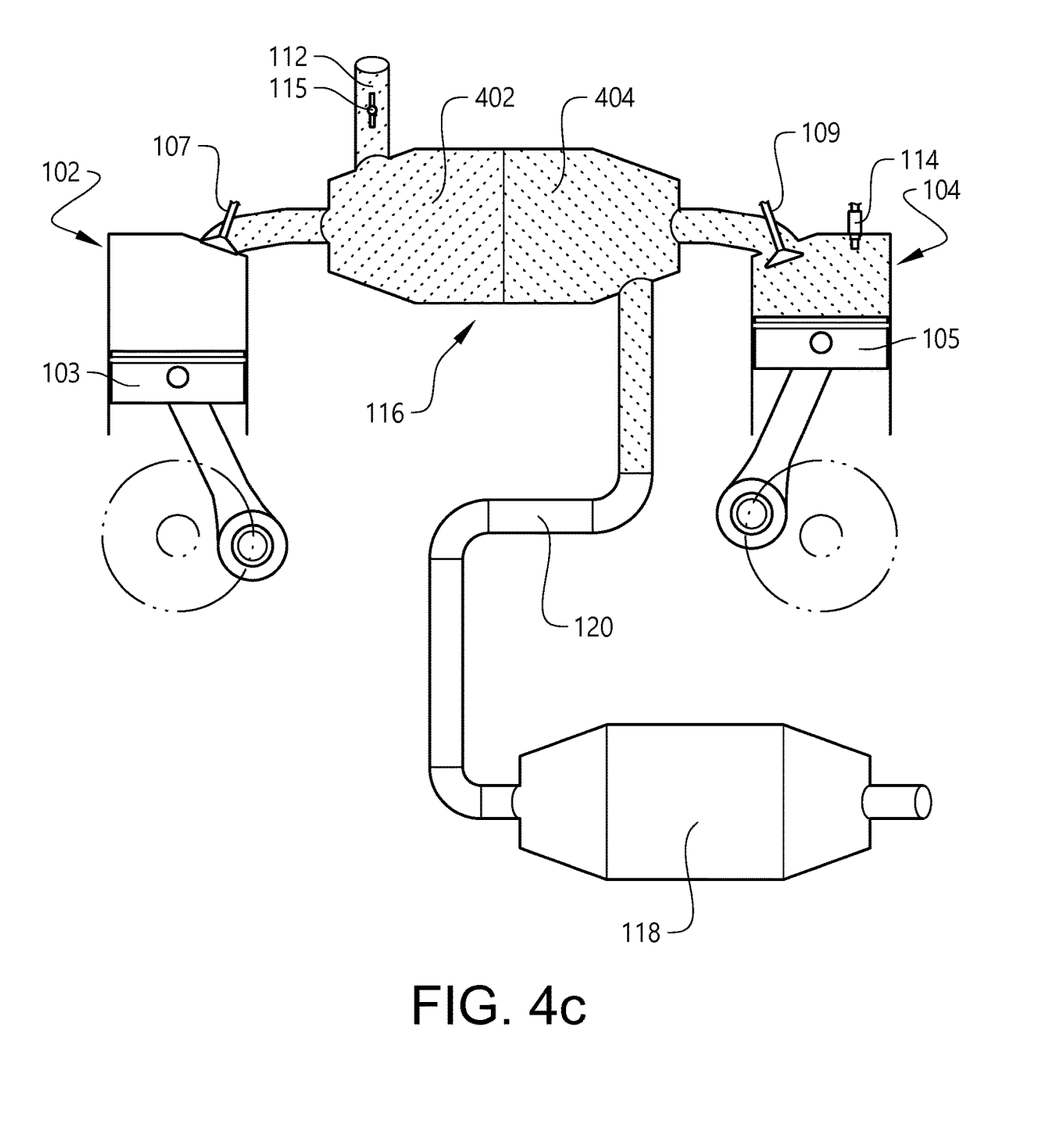

With reference to FIG. 4c, the first piston 103 now moves downwards within the first expansion cylinder 102 and the first outlet valve 107 is closed. At the same time, the second piston 105 is moving upwards within the second expansion cylinder 104 and the second outlet valve 109 is arranged in the open position. Hereby, exhaust gas 404 from the second expansion cylinder 104 is directed into the void volume 116 as well as to the exhaust gas conduit 120. The exhaust gas 404 from the second expansion cylinder 104 will hereby push the exhaust gas 402 already present in the void volume 116 back towards the first expansion cylinder 102 and into the EGR conduit 112. This is possible since the flow restriction arrangement (117 in FIG. 2) will, as described above, reduce the flow turbulence within the void volume 116. Hereby, when e.g. combustion gas is exhausted from the second expansion cylinder 104, this exhaust gas will not be mixed with the combustion gas already present in the void volume. Rather, the combustion gas from the second expansion cylinder 102 will substantially have the functionality of a plug and push the combustion gas in the void volume 116 in a direction towards the first expansion cylinder 102.

Figure 4D:
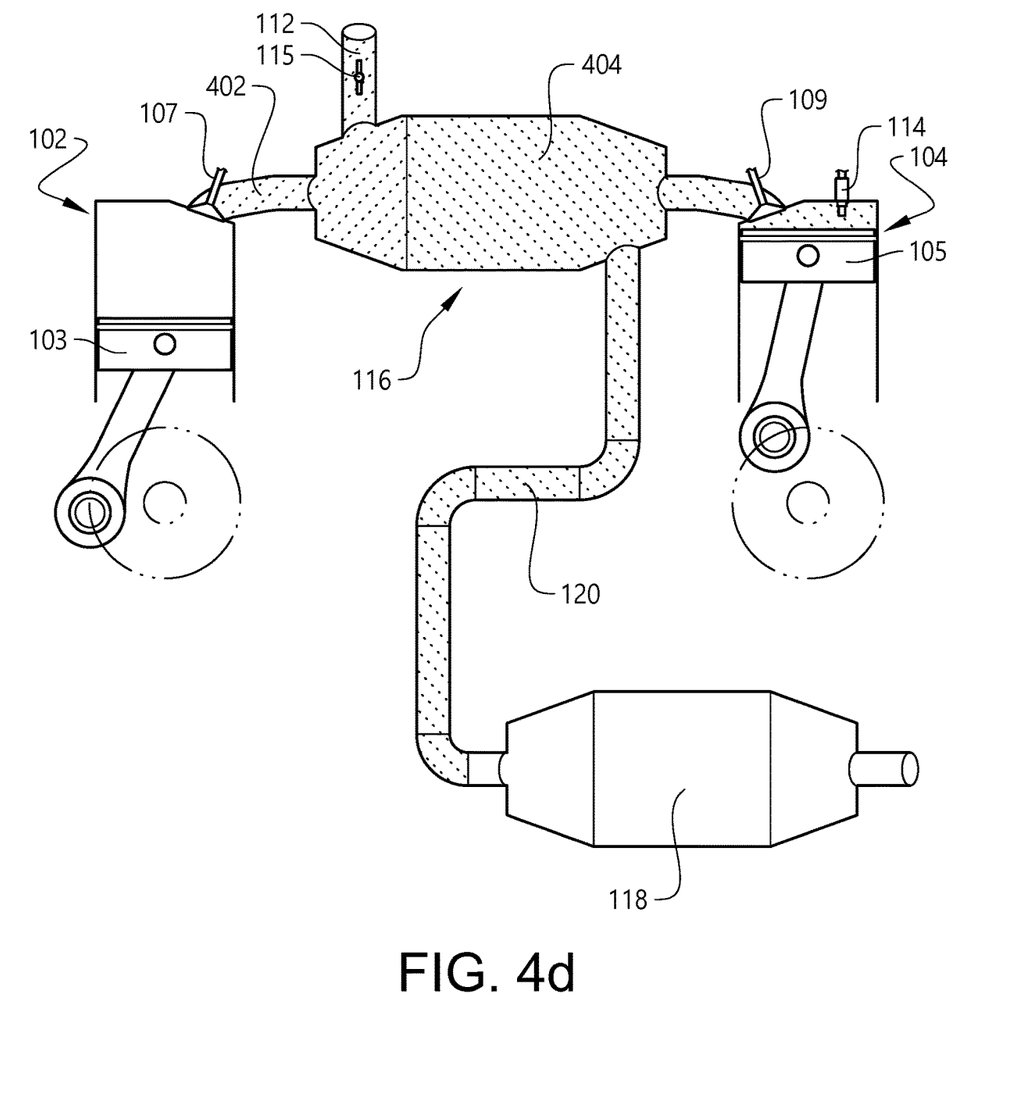

Finally, reference is made to FIG. 4d, the first piston 103 is positioned at the bottom dead center within the first expansion cylinder 102 and the second piston 105 is positioned at the top dead center within the second expansion cylinder 104. Hereby, the second expansion cylinder 104 has been completely emptied of exhaust gas 404, which exhaust gas 404 has been pushed further into the void volume 116 as well as directed further into the exhaust gas conduit 120 towards the exhaust gas aftertreatment system 118. As can be seen, exhaust gas 404 from the second expansion cylinder 104 has not reached the EGR conduit, since the volume of the volume is equal to, or larger than the volume of the second expansion cylinder 104.

FIGS. 4a-4d are mere schematic illustrations and it should be readily understood that, for example, when the second expansion cylinder has been completely emptied, the exhaust gas 404 therefrom may have reached the exhaust gas aftertreatment system 118.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine arrangement comprising:
   at least one combustion cylinder;
   a first and a second expansion cylinder, the first expansion cylinder being arranged in downstream fluid communication with the at least one combustion cylinder via a first conduit, wherein the second expansion cylinder is arranged in parallel with the first expansion cylinder and arranged in downstream fluid communication with the at least one combustion cylinder via a second conduit, wherein the first and second expansion cylinders are configured to receive combusted exhaust gas from the at least one combustion cylinder via a respective inlet valve of the first and second expansion cylinders; wherein the internal combustion engine arrangement comprises an interconnection conduit between an outlet of the first expansion cylinder and an outlet of the second expansion cylinder, and an engine aftertreatment system, the engine aftertreatment system being arranged in fluid communication with the interconnection conduit, wherein the outlet of the first expansion cylinder is further arranged in fluid communication with an exhaust gas recirculation, EGR, conduit for delivery of a flow of combusted exhaust gas to an intake passage of the internal combustion engine arrangement, and wherein the second expansion cylinder comprises a reducing agent injection device for controllable delivery of a reducing agent into the second expansion cylinder, wherein the interconnection conduit comprises a void volume, the EGR conduit being connected to the interconnection conduit at a position between the outlet of the first expansion cylinder and the void volume of the interconnection conduit, and wherein the engine aftertreatment system is connected to the interconnection conduit at a position between the void volume and the outlet of the second expansion cylinder.

2. The internal combustion engine arrangement according to claim 1, wherein the void volume comprises a flow restriction arrangement for reducing the flow turbulence within the void volume.

3. The internal combustion engine arrangement according to claim 2, wherein the flow restriction arrangement comprises an exhaust emission control device.

4. The internal combustion engine arrangement according to claim 3, wherein the exhaust emission control device comprises an oxidation catalyst.

5. The internal combustion engine arrangement according to claim 3, wherein the exhaust emission control device comprises a selective catalytic reduction, SCR, catalyst.

6. The internal combustion engine arrangement according to claim 2, wherein the flow restriction arrangement comprises a plurality of tube components arranged at a predetermined distance from each other along the flow direction within the void volume, the inner diameter of the tube components being smaller than the inner diameter of the void volume.

7. The internal combustion engine arrangement according to claim 6, wherein at least one tube component of the plurality of tube components is at least one of a rashig ring and a catalyst carrier.

8. The internal combustion engine arrangement according to claim 2, wherein the void volume is equal to, or larger than a cylinder volume of the second expansion cylinder.

9. The internal combustion engine arrangement according to claim 1, wherein the EGR conduit comprises an EGR valve for controlling a volume of flow of combusted exhaust gas delivered to the intake passage of the internal combustion engine arrangement.

10. The internal combustion engine arrangement according to claim 1, further comprising at least one compression cylinder, the compression cylinder being arranged in upstream fluid communication with the at least one combustion cylinder for delivery of compressed gas to an inlet of the combustion cylinder.

11. The internal combustion engine arrangement according to claim 10, wherein the EGR conduit is connected to an inlet of the at least one compression cylinder, such that exhaust gas from the EGR conduit is mixed with intake gas in the at least one compression cylinder.

12. A vehicle comprising an internal combustion engine arrangement according to claim 1.

* * * * *